United States Patent
Falk et al.

(10) Patent No.: US 12,452,036 B2
(45) Date of Patent: Oct. 21, 2025

(54) METHOD FOR CONFIGURING A SECURITY MODULE WITH AT LEAST ONE DERIVED KEY

(71) Applicant: Siemens Aktiengesellschaft, Munich (DE)

(72) Inventors: Rainer Falk, Poing (DE); Christian Peter Feist, Munich (DE); Johannes Zwanzger, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 112 days.

(21) Appl. No.: 17/599,780

(22) PCT Filed: Mar. 16, 2020

(86) PCT No.: PCT/EP2020/057077
§ 371 (c)(1),
(2) Date: Sep. 29, 2021

(87) PCT Pub. No.: WO2020/200729
PCT Pub. Date: Oct. 8, 2020

(65) Prior Publication Data
US 2022/0150056 A1  May 12, 2022

(30) Foreign Application Priority Data
Apr. 5, 2019  (EP) ..................... 19167509

(51) Int. Cl.
*H04L 9/08* (2006.01)
*H04L 9/06* (2006.01)

(52) U.S. Cl.
CPC .......... *H04L 9/0825* (2013.01); *H04L 9/0643* (2013.01); *H04L 9/0866* (2013.01); *H04L 9/0877* (2013.01)

(58) Field of Classification Search
CPC ... H04L 9/0825; H04L 9/0643; H04L 9/0866; H04L 9/0877; H04L 2463/081; H04L 63/06; G06F 21/72; G06F 21/57
See application file for complete search history.

(56) References Cited

U.S. PATENT DOCUMENTS

| | | | |
|---|---|---|---|
| 9,069,950 B2 * | 6/2015 | Austin | ................... H04L 63/126 |
| 10,009,325 B1 * | 6/2018 | David | ....................... H04L 9/16 |

(Continued)

FOREIGN PATENT DOCUMENTS

| | | |
|---|---|---|
| CN | 101681415 A | 3/2010 |
| CN | 101755269 A | 6/2010 |

(Continued)

OTHER PUBLICATIONS

PCT International Search Report and Written Opinion of International Searching Authority mailed Jun. 15, 2020 corresponding to PCT International Application No. PCT/EP2020/057077 filed Mar. 16, 2020.

(Continued)

*Primary Examiner* — Khalid M Almaghayreh
(74) *Attorney, Agent, or Firm* — Schmeiser, Olsen & Watts, LLP

(57) ABSTRACT

Provided is a method for configuring a security module with at least one derived key, having the following steps: providing a key; deriving a further key from the provided key or from a key previously derived from the provided key, wherein the further key is derived by using an alterable digital fingerprint as key derivation parameter, which is formed on the basis of a measurable current runtime configuration of a runtime environment communicating with the security module.

13 Claims, 1 Drawing Sheet

(56) References Cited

U.S. PATENT DOCUMENTS

| | | |
|---|---|---|
| 10,193,690 B1 * | 1/2019 | Self .................. H04L 9/0894 |
| 2006/0137023 A1 | 6/2006 | Benaloh |
| 2008/0313472 A1 | 12/2008 | Modesitt |
| 2010/0199104 A1 | 8/2010 | Van Rijnswou |
| 2010/0208888 A1 | 8/2010 | Weber |
| 2011/0091036 A1 * | 4/2011 | Norrman ............... H04L 9/065 |
| | | 380/44 |
| 2011/0191837 A1 * | 8/2011 | Guajardo Merchan ...................... |
| | | H04L 9/3278 |
| | | 726/6 |
| 2014/0098953 A1 * | 4/2014 | Dellow ............... H04L 9/0861 |
| | | 380/44 |
| 2014/0189365 A1 * | 7/2014 | Cox .................... G06F 21/72 |
| | | 713/189 |
| 2014/0258132 A1 * | 9/2014 | Swamy ............. G06Q 20/3278 |
| | | 705/67 |
| 2015/0006601 A1 * | 1/2015 | Aissi .................. H04L 63/0428 |
| | | 708/250 |
| 2015/0149779 A1 | 5/2015 | Falk et al. |
| 2015/0319151 A1 | 11/2015 | Chastain et al. |
| 2015/0358301 A1 | 12/2015 | Dalbehera et al. |
| 2016/0036587 A1 | 2/2016 | Hans et al. |
| 2016/0269182 A1 | 9/2016 | Sriram et al. |
| 2017/0170957 A1 | 6/2017 | Smith et al. |
| 2017/0329578 A1 * | 11/2017 | Iscen ...................... G06F 9/52 |
| 2019/0044716 A1 | 2/2019 | Nemiroff et al. |
| 2019/0109714 A1 * | 4/2019 | Clark ................. H04L 63/0428 |
| 2019/0238519 A1 * | 8/2019 | Bikumala ........... H04L 63/0823 |
| 2019/0306136 A1 * | 10/2019 | David .................. H04L 9/3242 |
| 2023/0224145 A1 * | 7/2023 | Ben David ............. H04W 4/44 |
| | | 713/153 |

FOREIGN PATENT DOCUMENTS

| | | | |
|---|---|---|---|
| CN | 102057617 A | 5/2011 | |
| CN | 102812472 A * | 12/2012 | ........... H04L 9/3278 |
| CN | 103378966 A | 10/2013 | |
| CN | 104350703 A | 2/2015 | |
| CN | 105027136 A | 11/2015 | |
| CN | 105960775 A | 9/2016 | |
| CN | 106415564 A | 2/2017 | |
| CN | 107111728 A | 8/2017 | |
| CN | 107409002 A | 11/2017 | |
| DE | 102015208899 A1 | 3/2016 | |
| EP | 2329423 A1 | 6/2011 | |
| EP | 2738974 A1 | 6/2014 | |
| WO | WO-2017005410 A1 * | 1/2017 | ........... H04L 9/0866 |
| WO | 2018231753 A1 | 12/2018 | |

OTHER PUBLICATIONS

Wang Lina et al:"A management approach to key-used times based on trusted platform module in cloud storage", p. 1628-1636, Aug. 15, 2013.

Xiong Jun :"Design of cloud computing data security storage strategy based on improved secret key", Modern Electronics Technique, vol. 39 No. 20, doi : 10.16652/j.issn.1004☐0373x.2016.20.009, Oct. 2016.

* cited by examiner

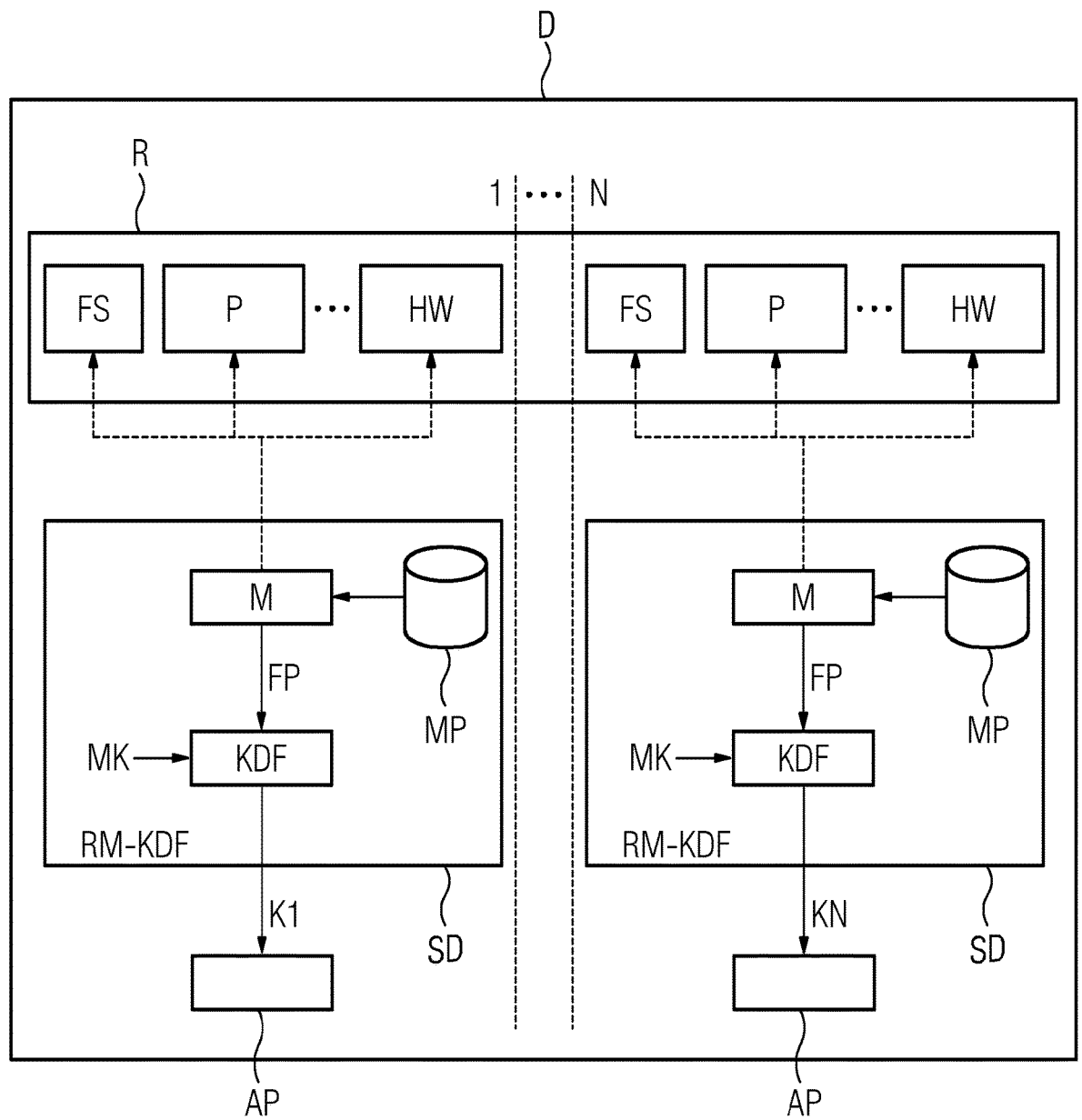

METHOD FOR CONFIGURING A SECURITY MODULE WITH AT LEAST ONE DERIVED KEY

CROSS-REFERENCE TO RELATED APPLICATIONS

This application claims priority to PCT Application No. PCT/EP2020/057077, having a filing date of Mar. 16, 2020, which is based off of EP Application No. 19167509.9, having a filing date of Apr. 5, 2019, the entire contents both of which are hereby incorporated by reference.

FIELD OF TECHNOLOGY

The following relates to a method for configuring a security module with at least one derived key.

BACKGROUND

Modern data processing systems, for cryptographic operations such as encrypting data or authenticating systems or (software) modules with respect to one another, require what are known as trust anchors. A trust anchor or trust point forms the basis for protecting devices, for example IoT devices or field devices or data processing systems such as for example embedded systems or control computers. A trust anchor is able to guarantee confidence in the uncompromised operation of the data processing system when the system is started and/or during ongoing operation. A trust anchor may comprise a cryptographic key that is able to be used for example for a secure boot process or to authenticate the data processing system or to use a key file of the data processing system or to confirm an operating state of the data processing system or to check an update file (firmware update). The term "anchor" is therefore based on the fact that security or trusted authority concepts of data processing systems use the trust anchor as a basis, and there is, or must be, therefore a requirement in this case for the trust anchor itself to be secure and uncompromised.

One known trust anchor is for example the trusted platform module (TPM) specified in 2009 by ISO/IEC 11889, which is present in all modern PCs and is a necessary requirement in modern operating systems for particular cryptographic operations. By way of example, the "BitLocker" hard drive encryption system of the widely used WINDOWS® operating system is based on a TPM. However, many other implementations of a trust anchor are conceivable, for example a crypto controller, an authentication module or a secure element integrated into a CPU.

It is possible to operate a security module with n≥2 keys. A key of generation i may be derived iteratively from the key of generation i−1 for all 1<i≤n and be stored in a memory area i. It is thus possible to perform cryptographic operations that are ranked in classes, wherein cryptographic operations of the kth class are performed with the key stored in the kth memory area, wherein 1≤k≤n.

Further keys may be derived from stored keys, for example by way of a key derivation function (KDF). Key derivation is based on static properties. By way of example, a key is derived on the basis of a software binary file, fixed labels in a file system, or hard-coded derivation values in firmware. If an attacker gains control over part of the system, for example by exploiting a software weakness, the derived keys are not protected sufficiently. The keys used by other software components may in particular be reconstructed (derived) at any time by an attacker.

SUMMARY

An aspect relates therefore to specify a method for handling keys that exhibits improved protection against attackers compared with that mentioned at the outset.

An aspect relates to improve methods and apparatuses or appliances or devices compared with the abovementioned conventional art.

An aspect relates to a method for configuring a security module with at least one derived key, comprising the following steps:

providing a key;
deriving a further key from the provided key or from a key derived beforehand from the provided key, characterized in that a changeable or variable digital fingerprint is incorporated into the derivation or taken into consideration as key derivation parameter, this fingerprint being formed on the basis of a measurable current runtime configuration of a runtime environment communicating with the security module.

The security module is in this case configured during the runtime of the runtime environment operating the security module. The security module is thereby reconfigured depending on the actual current runtime configuration. This may take place on a one-time basis, but repeatedly during runtime of the runtime environment. The respective current fingerprint of the runtime environment is ascertained while performing the key derivation, and the key is derived on the basis thereof. In this case, measurements for ascertaining the fingerprint likewise take place when performing the key derivation. A measurement may be performed by the runtime environment itself and provided to the security module. To this end, a specific fingerprint measurement process (or fingerprint measurement process task) is performed in the runtime environment in addition to other processes. The measurement process may for example be isolated from other processes by a hypervisor. The measurement may however take place on a separate computer core of a multicore runtime environment, on a separate measurement apparatus, for example a separate microcontroller, or using the security module itself.

The security module may be part of a device. The provided key may be a master key or initial key or be derived therefrom. In configurations of embodiments of the invention, the initial key may be implemented such that any other access is prevented or is physically impossible. The runtime environment is for example formed by a CPU or computer appliance that addresses or controls or communicates with the security module, wherein the security module is configured using the method according to embodiments of the invention.

The runtime properties of a regular operative runtime environment may be detected and used as input parameters for a key derivation. The measurable or monitorable current runtime configuration provides a fingerprint that changes when a system is manipulated. Examples of manipulations are the starting of an additional process or the integrity information of operating data. The fingerprint is determined dynamically at runtime and is incorporated into a key derivation function as key derivation parameter or into a key generation function as key formation parameter. This has the advantage that, in the event of changed runtime integrity information, it is not possible to ascertain cryptographic keys of the non-manipulated state.

The abovementioned step of deriving a further key may be repeated (iteratively) once or multiple times. At least one cryptographic operation may be performed using the derived further key. Key change events may be for example specific key update commands or the change of the superordinate data processing system to another (operating) state. The execution of a cryptographic operation may also serve as key change event that allows the implementation of keys for just one-time use for an operation (for example for encrypting data), wherein these keys may then remain available for other operations (for example for decryption or verification purposes).

The measurable runtime configuration may comprise at least one ascertainable state of the runtime environment or at least one state of the runtime environment that is triggered by the occurrence of a monitorable event. States of the runtime environment and/or occurrences of events are in this case measurable runtime properties of the runtime environment at a particular time. This runtime configuration may form a variable fingerprint (runtime integrity fingerprint) that ensures integrity. At a particular time, it is possible to measure for example HW counters, a real-time clock, meta info (about ongoing processes or about the file system, file properties, dedicated files, state-defining security mechanisms, static data, file contents, process name, process number, process priority, watchdog, benchmark functions, periphery state, power consumption profile, electromagnetic radiation profile, etc.

A one-way function is advantageously used for the key derivation. A one-way function is a function in the case of which it is possible to infer the underlying key from the derived key only with very high amount of effort (with respect to computational power and memory).

The monitorable or measurable runtime properties are both static properties (for example the checksum of a read-only file system) and dynamic properties (for example the current runtime of the system since a power-on reset—POR). Repeatedly deriving the same key is thus linked to the state of the runtime environment. If this state changes, either due to the intended change of the operating phase or due to changes owing to an attack, different keys are derived. Side channel information may also be measured as a fingerprint, for example the temporal behavior (for example cache timing) or the power consumption profile.

An attack (changes that occur at runtime, for example starting of a harmful process following exploitation of a software weakness) may lead to a change in the runtime properties of the runtime environment. If these are taken into account in a key derivation, such attacks automatically lead to a situation whereby the same keys are no longer able to be derived as in an integral state of the device, and critical data (for example encrypted files) are thus protected better from an attacker.

An aspect furthermore relates to a security module, to a device and to a computer program product (non-transitory computer readable storage medium having instructions, which when executed by a processor, perform actions).

The security module is able to be configured with at least one derived key, having:
a reception unit for a provided key;
a derivation unit for deriving a further key from the provided key or from a key derived beforehand from the provided key,
characterized by
a generation unit that is designed to form a changeable or variable fingerprint using a measurable current runtime configuration of a runtime environment communicating with the security module, which fingerprint is incorporated into the derivation as key derivation parameter.

The device having a runtime environment has such a security module, characterized by
a provision unit for providing a key and
a measurement unit for measuring a current runtime configuration, which is used to form a variable fingerprint that is incorporated, as key derivation parameter, into a derivation of a further key from the provided key or from a key derived beforehand from the provided key.

The computer program product comprising computer-executable instructions that, when loaded into a device (for example computer), are designed to perform a method in accordance with the abovementioned type and embodiments.

Provision is furthermore made for a computer program (product) comprising program code that is able to be executed by at least one processor and has the effect that the at least one processor performs the (operating) method according to embodiments of the invention and its embodiments. The computer program may run on a device/module or apparatus of the abovementioned type or be stored as a computer program product on a computer-readable medium.

The apparatuses, appliances or devices, modules and computer program (products) may be designed in accordance with the developments/embodiments of the abovementioned method and its developments/embodiments, and vice versa.

BRIEF DESCRIPTION

Some of the embodiments will be described in detail, with reference to the following figures, wherein like designations denote like members, wherein:

The single figure shows a schematic illustration of a device D. It is pointed out that the explanation of embodiments of the invention in connection with the device is given in a purely exemplary manner and without restricting embodiments of the present invention to such a device.

DETAILED DESCRIPTION

The figure shows a device D. The relationship between runtime properties of a runtime environment R, the division into N different system states S1 to SN and the derivation of corresponding keys with the aid of a master key MK are illustrated. The underlying functionality is implemented by the runtime measurement key derivation function RM-KDF, which is integrated in a security module SD that is integrated into the device D or coupled to the device D. It may also be implemented in a distributed manner, that is to say a first part of the runtime measurement key derivation function RM-KDF may be integrated on the security module, and a second part of the runtime measurement key derivation function RM-KDF may be coupled to the security module.

The system or runtime states 1 to N differ in terms of the runtime properties of one or more components, for example the processes P running at the time of key derivation, file system properties FS and hardware states HW, such as for example the value of a hardware counter. If a key is intended to be derived, the RM-KDF measured values (for example one-way or hash values of files) are taken from the runtime environment R. The parts of the runtime environment that are intended to be measured are predefined in this case by a measurement rule system MP (measurement policy). All of the measured values M, which may be maintained for example with a running hash value, then serve, together with a master key MK, as input parameters for a key derivation function KDF, for example based on HMAC-SHA256. If the state of a measured runtime component, due to an attack, no longer corresponds to that expected, for example due to an attacker starting a process for which no provision is made in the state, the derived key is also changed. Objects protected by the key are thus accessible only in states of the runtime environment that are defined as valid.

The states 1 to N are defined implicitly by the measurement policy (measurement rule) MP and the states of the measured runtime components. The measurement policy MP may be different for each state, or identical for multiple states. Multiple RM-KDFs may accordingly be implemented on a device D, these using different measurement policies, derivation functions KDFs and/or master keys MK.

The measurement policy MP, the measurement functions for all of the measured values M and the key derivation functions KDF may be implemented in principle either in software or in hardware components. The master key MK used for the derivation may in this case either be stored in hardware (for example hardware-based trust anchor) or implemented in software (for example as part of an obfuscated routine).

Multiple options for measurable runtime properties are set forth below. They may be combined as desired to form a measurement policy MP.

- Previous runtime of the device D since a reset, for example by way of a hardware counter or a real-time clock. The previous runtime of the software, for example of a Linux kernel (/proc/uptime), may also be used here.
- Performance runtime data (for example CPU load, memory utilization, utilization of input/output interfaces, for example network interfaces, DMA transfers, interrupt frequency).
- Power consumption profile, electromagnetic radiation profile (for example temporal profile, frequency spectrum)
- Meta information about running processes P, for example the user under which a process is running, what process started it (process tree/parent-child relationship of processes/"process chain"), process priority, process number, SELinux domain of a process, namespaces and cgroups in which a process is running.
- Currently appended file systems and their properties (for example read-only). Keys may thus also be derived on the basis of the existing, interchangeable peripheral modules—such as for example USB dongles.
- Dedicated files that reflect the integrity of the current system. By way of example, security-critical events may be written to specific files, which are jointly measured in the course of the key derivation, by a host-based intrusion detection system (HIDS). A further option is to jointly incorporate configuration data that restrict logging onto the system (or even prevent it entirely) into the measurement: in the event of an attack in which the configuration is changed such that logging on is possible again (in particular in order to be able to observe the system "internally" at runtime), only incorrect keys are then derived.
- The state of particular security mechanisms may be jointly incorporated. For instance, on a Linux-based system, it is possible to derive the correct keys for an application only when one or more security mechanisms are in a particular state (for example SELinux in "enforcing" mode).
- It is possible to jointly measure static data, such as for example a hardware ID, or configuration files in the file system. If the runtime measurement key derivation function RM-KDF is executed in another environment (different hardware and thus hardware ID, different configuration), or if the files that are assumed to be static are manipulated, different keys are thus derived.
- It is possible to check for the presence of particular file contents that are supposed to be present for example from a provisioning phase of the device.
- Meta information of the file system, such as for example the size of particular parts, access or change times, permissions, users/owners, targets of symbolic links, etc.
- It is possible to jointly incorporate how the runtime measurement key derivation function RM-KDF is used or called. This may thus for example jointly incorporate the process chain, starting from the called component, to the root of the process tree. In this case, the names of the processes contained in the process chain may for example be hashed continuously and used as part of the key derivation parameter. It is thus possible to ensure that the correct keys are able to be derived only in the course of an intended call.
- It is possible to jointly incorporate a watchdog (hardware or software function) that monitors the integrity of the runtime environment.

It is possible to measure the execution time of a specifically provided benchmark function and to jointly incorporate this into the derivation—with a certain amount of play for normal measurement variances. If the execution of such a function requires for example 250 ms with a standard deviation (Sigma) of 10 ms, an (integer) division by 100 ms on a non-manipulated device with 5-Sigma reliability gives the value 2. By contrast, this makes it more difficult for an attacker to reproduce the derived keys in a simulated or emulated environment, because the performance of the device then additionally also has to be replicated in a sufficiently accurate manner (in the example: +/−20%).

The applications, with an application being indicated by way of example by AP in the figure, are able to derive keys at runtime using the library in order to perform a cryptographic operation using the derived key. Such operations are able to protect and access security-critical objects, for example encrypted file systems, or private keys for a TLS connection. If a key is intended to be derived, the runtime measurement key derivation function RM-KDF uses the measurement function and the measurement policy MP in order to measure or to ascertain parts of the runtime environment that are defined therein or defined events at one or more particular times and to define them as a runtime configuration. The measurement function, using dedicated kernel interfaces, aggregates information about currently appended file systems (mounts), the state of certain peripheral modules (for example FPGA, GPIO, MAC address), the previous runtime of the operating system (uptime), static contents from the file system and the names of the processes in the process chain of the caller in a running hash value. The aggregated value is then used as key derivation parameter for a key derivation function with the master key MK. The derived key K1 to KN is different depending on the application called, since these belong to different process chains.

A variable fingerprint FP formed from the runtime configuration and the consideration thereof as key derivation parameter may be considered as a configuration of the security module. The applications may use these derived keys for example to access private file systems. If an attacker, by way of a further process, likewise attempts to derive a key using the runtime measurement key derivation function RM-KDF, then this will be different. Both offline and online attacks generally change dynamic properties of a runtime environment (for example configuration files, options of appended file systems). Access to keys from valid states is thus made much more difficult.

Embodiments of the invention have the advantage that access to keys may be linked to the current state of static and in particular dynamic properties of the runtime environment. In the event of an intervention in the runtime environment (physical attack, remote attack), the key derivation is able to be influenced and it is thus no longer possible to derive valid keys in a non-trusted environment. The state dependency may furthermore be intentionally used to provide different keys at different runtime phases in software. This specifically has the advantage that, in the case of a compromised runtime phase, it is not possible to derive the keys of the current or the other phases.

The processes or method sequences described above may be implemented on the basis of instructions that are present on computer-readable storage media or in volatile computer memories (referred to below collectively as computer-readable memories). Computer-readable memories are for example volatile memories such as caches, buffers or RAM, and non-volatile memories such as interchangeable data carriers, hard drives, etc.

The functions or steps described above may in this case be present in the form of at least one set of instructions in/on a computer-readable memory. The functions or steps are in this case not linked to a particular set of instructions or to a particular form of sets of instructions or to a particular storage medium or to a particular processor or to particular execution schemes, and may be executed by software, firmware, microcode, hardware, processors, integrated circuits etc. on their own or in any desired combination. In this case, a very wide variety of processing strategies may be used, for example serial processing using a single processor or multiprocessing or multitasking or parallel processing, etc.

The instructions may be stored in local memories, but it is also possible to store the instructions on a remote system and to access them via a network.

The device D may have one or more processors. The term "processor", "central signal processor", "control unit" or "data evaluation means" or "a data evaluator" comprises processing means or processor in the broadest sense, that is to say for example servers, universal processors, graphics processors, digital signal processors, application-specific integrated circuits (ASICs), programmable logic circuits such as FPGAs, discrete analog or digital circuits and any desired combinations thereof, including all other processing means or processors known to a person skilled in the art or developed in the future. Processors may in this case consist of one or more apparatuses or appliances or units. If a processor consists of multiple apparatuses, these may be designed or configured for the parallel or sequential processing or execution of instructions.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for configuring a security module, comprising the following steps:
   providing a key;
   deriving a further key from the provided key or from a key derived beforehand from the provided key;
   configuring the security module with the derived further key;
   performing a fingerprint measurement process in a runtime environment, wherein the fingerprint measurement process is isolated from other processes by a hypervisor;
   wherein a changeable digital fingerprint determined dynamically at runtime is incorporated into the derivation as key derivation parameter, this fingerprint being formed on the basis of a measured current runtime configuration of the runtime environment communicating with the security module;
   wherein the method further comprises providing a measurement policy, wherein the measurement policy indicates a part of the runtime environment to be measured to form the fingerprint; and
   wherein the measurement policy includes: file systems and properties, and/or meta information of a file system.

2. The method as claimed in claim 1, wherein the step of deriving a further key is repeated once or multiple times.

3. The method as claimed in claim 1, wherein at least one cryptographic operation is performed using the derived further key.

4. The method as claimed in claim 1, wherein the measured runtime configuration comprises at least one ascertainable state of the runtime environment or at least one state of the runtime environment that is triggered by the occurrence of a monitorable event.

5. The method as claimed in claim 1, wherein the fingerprint is formed on the basis of the measured current runtime configuration of the runtime environment and a static property.

6. The method as claimed in claim 1, wherein the fingerprint is formed on the basis of processes running at the time of deriving, file system properties, and hardware states.

7. The method as claimed in claim 1, wherein the fingerprint measurement process takes place on a separate computer core of a multicore runtime environment, on a separate measurement apparatus, on a separate microcontroller and/or on the security module.

8. A security module, the security module including a hardware processor and able to be configured with at least one derived key, the security module further configured for:
   providing a provided key;
   performing a fingerprint measurement process in a runtime environment, wherein the fingerprint measurement process is isolated from other processes by a hypervisor;
   providing a measurement policy, wherein the measurement policy indicates a part of the runtime environment communicating with the security module to be measured to form a changeable digital fingerprint determined dynamically at runtime on the basis of the measured part of the runtime environment, wherein the measurement policy includes: file systems and properties, and/or meta information of a file system; and
   deriving a further key from the provided key, or from a key derived beforehand from the provided key, using the changeable digital fingerprint as a key derivation parameter.

9. The security module as claimed in claim 8, wherein the fingerprint measurement process takes place on a separate computer core of a multicore runtime environment, on a separate measurement apparatus, on a separate microcontroller and/or on the security module.

10. A device having a runtime environment, the device having a hardware processor, the device also having or being coupled with a security module configured with at least one derived key and configured for:
receiving a provided key;
deriving a further key from the provided key or from a key derived beforehand from the provided key;
generating a dynamically determined changeable fingerprint using a measured current runtime configuration of the runtime environment, which fingerprint is incorporated into the derivation as key derivation parameter;
wherein the device and/or the security module are further configured for:
providing the provided key;
performing a fingerprint measurement process in the runtime environment, wherein the fingerprint measurement process is isolated from other processes by a hypervisor;
measuring the measured current runtime configuration, which is used to form the changeable fingerprint that is incorporated, as key derivation parameter, into the derivation of the further key from the provided key or from the key derived beforehand from the provided key, wherein measuring the measured current runtime configuration is performed according to a measurement policy that indicates a part of the current runtime environment to be measured to form the changeable fingerprint; and
wherein the measurement policy includes: file systems and properties, and/or meta information of a file system.

11. The device as claimed in claim 10, wherein the fingerprint measurement process takes place on a separate computer core of a multicore runtime environment, on a separate measurement apparatus, on a separate microcontroller and/or on the security module.

12. A computer program product, comprising a non-transitory computer readable hardware storage device having computer readable program code stored therein, said program code executable by a processor of a computer system to implement a method for configuring a security module with at least one derived key, the method comprising:
providing a key;
deriving a further key from the provided key or from a key derived beforehand from the provided key, wherein a dynamically determined changeable digital fingerprint is incorporated into the derivation as key derivation parameter, this fingerprint being formed on the basis of a measured current runtime configuration of a runtime environment communicating with the security module;
and wherein the method further comprises:
performing a fingerprint measurement process in the runtime environment, wherein the fingerprint measurement process is isolated from other processes by a hypervisor;
providing a measurement policy, wherein the measurement policy indicates a part of the runtime environment to be measured to form the dynamically determined changeable fingerprint; and
wherein the measurement policy includes: file systems and properties, and/or meta information of a file system.

13. The computer program product as claimed in claim 12, wherein the fingerprint measurement process takes place on a separate computer core of a multicore runtime environment, on a separate measurement apparatus, on a separate microcontroller and/or on the security module.

* * * * *